United States Patent [19]

Bauer et al.

[11] Patent Number: 4,486,350
[45] Date of Patent: Dec. 4, 1984

[54] PROCESS FOR THE PREPARATION OF SULPHUR DYESTUFFS OF THE PHTHALOCYANINE SERIES

[75] Inventors: Wolfgang Bauer, Maintal; Klaus Kühlein, Kelkheim; Gert Nagl, Niederdorfelden, all of Fed. Rep. of Germany

[73] Assignee: Cassella Aktiengesellschaft, Frankfurt, Fed. Rep. of Germany

[21] Appl. No.: 479,691

[22] Filed: Mar. 28, 1983

[30] Foreign Application Priority Data

Apr. 30, 1982 [DE] Fed. Rep. of Germany ....... 3216125

[51] Int. Cl.³ ..................... C09B 47/04; C09B 47/30
[52] U.S. Cl. ..................... 260/245.86; 260/245.72; 260/245.85
[58] Field of Search ..................... 260/245.72, 245.85, 260/245.86

[56] References Cited

U.S. PATENT DOCUMENTS

| | | | |
|---|---|---|---|
| 2,342,663 | 2/1944 | Haddock | 260/245.86 |
| 2,484,300 | 10/1949 | Mayhew | 260/245.86 |
| 3,105,070 | 9/1963 | Bitterli | 260/245.72 |
| 3,378,568 | 4/1968 | Bryan | 260/245.78 |
| 3,544,565 | 12/1970 | Razavi | 544/74 |

FOREIGN PATENT DOCUMENTS 544953 5/1942 United Kingdom .
992381 5/1965 United Kingdom .

OTHER PUBLICATIONS

Moser et al., Phthalocyanine Compounds, Reinhold Publishing Corp., New York (1963), pp. 239, 285 and 286.

*Primary Examiner*—Richard Raymond
*Attorney, Agent, or Firm*—Connolly and Hutz

[57] ABSTRACT

Preparation of phthalocyanine sulphur dyestuffs is improved by reducing phthalocyaninesulphochlorides in the presence of hydriodic acid and a non-free metal reducing agent which converts iodine into hydriodic acid.

15 Claims, No Drawings

PROCESS FOR THE PREPARATION OF SULPHUR DYESTUFFS OF THE PHTHALOCYANINE SERIES

The present invention relates to a process for the preparation of sulphur dyestuffs of the phthalocyanine series by reducing phthalocyaninesulphochlorides of the formula I

$$Pc(SO_2Cl)_n \qquad (I)$$

wherein Pc denotes the radical of a metal-free phthalocyanine or of a metal-containing phthalocyanine and n denotes the number 1, 2, 3 or 4, preferably 2, 3 or 4.

Various methods of reduction for converting phthalocyaninesulphochlorides of the general formula I into sulphur dyestuffs are already known (compare, for example, D. C. Orton in K. Venkataraman "The Chemistry of Synthetic Dyes", Volume VII, pages 12 to 13, Academic Press (1974)).

For example, copper phthalocyaninesulphochlorides are converted, using zinc or iron in an acid reaction medium, into the corresponding copper phthalocyanine mercaptans, which are suitable for dyeing cellulose fibres in blue or green colour shades (compare British Pat. No. 544,953 and U.S. Pat. No. 2,484,300). Mercapto-copper phthalocyanines are also obtained by reducing copper phthalocyaninesulphochlorides with thiourea and iron(II) salts (Rumanian Patent Specification No. 57,389, Chem. Abstracts 84, 46,054 h). These methods of reduction produce metal-containing effluents, which are disadvantageous from an ecological point of view, and working up the latter involves heavy expenditure.

It is also already known to convert copper or nickel phthalocyaninesulphochlorides into the phthalocyaninesulphinates by means of hydrazine (British Patent Specification No. 906,643) or into phthalocyaninesulphinates containing additional thiosulphonate groups by means of sodium sulphide or sodium hydrogen sulphide (U.S. Pat. Nos. 3,378,568 or 3,420,615). The phthalocyanine derivatives thus prepared, which contain either sulphinate groups or sulphinate and thiosulphonate groups, are then converted into green sulphur dyestuffs by means of thiosulphate or sodium polysulphide at elevated temperatures of, for example, 140° to 180° C. in an autoclave (U.S. Pat. No. 3,378,568). This process has the disadvantage that two process stages and high temperatures are required in the preparation of the dyestuffs.

In a further known process (French Patent Specification No. 1,526,096), copper phthalocyaninesulphochlorides are reduced, by means of thiourea or by means of sodium sulphide and thiourea, to sulphur dyestuffs which dye cellulose fibres in green colour shades from a solution of an alkali metal sulphide. Large quantities of thiourea, which make the process expensive and lead to factory effluents containing a high proportion of organic compounds which are bio-degradable with difficulty, are required for this process. Water-insoluble phthalocyanine dyestuffs containing polysulphide and isothiourea groups can be prepared in a similar manner by reacting phthalocyaninesulphochlorides with thiourea or thiourea and iron or iron(II) salts (Rev. Chim. (Bucharest), 1975, 26 (12), 993; Chem. Abstracts 85, 7241 t).

In a further known method for the preparation of green sulphur dyestuffs containing phthalocyanine radicals (compare U.S. Pat. Nos. 2,342,662 and 2,395,117), nitro-copper phthalocyanines, prepared from nitrophthalimide, urea and copper chloride, at temperatures of 190° to 210° C., are reduced with sodium hydrosulphide solution to give the corresponding amino-copper phthalocyanines. The latter are diazotised in a further reaction stage and are reacted with sodium thiocyanate to give thiocyanato-copper phthalocyanines, which can be employed as green sulphur dyestuffs. This process has a number of pecuniary and ecological disadvantages, caused by the necessity to employ a large number of pieces of equipment in the 3-stage process, which takes place with a poor space-time yield, and by the ecologically disadvantageous factory effluent produced in every stage of the reaction.

In the case of the phthalocyanines containing more than one sulphochloride group, only one sulphochloride group is reduced to the sulphinic acid group using sodium bisulphite or sodium sulphite, while additional sulphochloride groups are hydrolysed to give sulphonic acid groups (British Patent Specification No. 960,643).

The process according to the invention does not have the difficulties and disadvantages of the processes hitherto known for reducing phthalocyaninesulphochlorides to sulphur dyestuffs.

The process, according to the invention, for the preparation of sulphur dyestuffs of the phthalocyanine series by reducing phthalocyaninesulphochlorides of the formula I is characterised in that the compound of the formula I is reduced in the presence of hydriodic acid and a reducing agent which converts iodine into hydriodic acid in the acid reaction medium.

Suitable starting materials of the formula I for the process according to the invention are the mono-, di-, tri- and tetra-sulphochlorides of phthalocyanine and of metal-containing phthalocyanines, such as, for example, copper phthalocyanine, nickel phthalocyanine or cobalt phthalocyanine. The following are examples of suitable starting materials of the formula I: phthalocyaninetetrasulphochloride, copper phthalocyaninedisulphochloride, copper phthalocyaninetrisulphochloride, copper phthalocyaninetetrasulphochloride, nickel phthalocyaninetetrasulphochloride, nickel phthalocyaninetrisulphochloride, cobalt phthalocyaninetrisulphochloride, cobalt phthalocyaninetetrasulphochloride or mixtures of the phthalocyaninesulphochlorides indicated. The phthalocyaninesulphochlorides of the formula I are known compounds or can be prepared in a manner which is in itself known, for example by sulphochlorinating phthalocyanines with chlorosulphonic acid, or with chlorosulphonic acid and thionyl chloride, at elevated temperatures (compare, for example, D. G. Orton in K. Venkataraman "The Chemistry of Synthetic Dyes", Volume VII, pages 12 to 13, Academic Press, 1974, and Literature quoted therein).

In the process according to the invention, the reduction is carried out by means of hydriodic acid. In this process it is only necessary to employ catalytic quantities of hydriodic acid. Instead of hydriodic acid, it is also possible to employ an equivalent quantity of a substance which forms hydriodic acid under the reaction conditions, such as, for example, iodine or an iodide, in particular an alkali metal iodide, such as, for example, sodium iodide or potassium iodide or phosphorus triiodide. It is also possible to employ mixtures of hydriodic acid and/or substances which provide hydriodic acid.

As well as the hydriodic acid or substance which provides hydriodic acid, a further reducing agent is also employed, which, in the acid reaction medium and under the reaction conditions employed, reconverts into hydriodic acid the iodine liberated in the reduction of the iodine initially employed. Examples of reducing agents having a redox potential of this type are sulphur dioxide or substances which provide sulphur dioxide, such as, for example, bisulphites, sulphites or pyrosulphites; further suitable examples are phosphorous acid, phosphites, hypophosphorous acid, hypophosphites, hydrazine and hydrazine salts, such as hydrazine chloride, hydrazine sulphate or dihydrazine sulphate. Bisulphites, sulphites, phosphites, hypophosphites or pyrosulphites which are employed are, above all, the corresponding alkali metal salts, especially the corresponding sodium or potassium salts. It is also possible to use mixtures of various reducing agents of this type, provided that no side-reactions take place between them. Preferred reducing agents are sulphur dioxide and substances which provide sulphur dioxide, such as bisulphites, sulphites or pyrosulphites.

The process according to the invention is carried out in water or in a mixture of water and one or more water-miscible organic solvents. The following may be mentioned as examples of suitable water-miscible organic solvents: alcohols, in particular those having 1 to 4 C atoms, such as, for example, methanol, ethanol, i-propanol, n-propanol or tert.-butanol, ketones, such as, for example, acetone or methyl ethyl ketone, or carboxylic acids, such as, for example, acetic acid. It is preferable to carry out the process according to the invention in water.

The process according to the invention is carried out at temperatures of 20° to 200° C., preferably 60° to 130° C., advantageously while stirring. In the case of reaction temperatures which, under normal pressure, are above the boiling point of water or of a water-miscible organic solvent, the reaction is carried out in an autoclave. It is also advantageous to carry out the reaction in an autoclave if sulphur dioxide or a substance which splits off sulphur dioxide is used as a further reducing agent. Within the temperature range mentioned and under the excess pressure set up, the reaction is normally complete after reaction times of 30 minutes to 8 hours. At the start of the reaction the aqueous phase should have a pH value less than 4. Normally, such a pH value is set up in the aqueous phase without any special action. Only in the event that a strongly alkaline reducing agent, such as hydrazine, is used for the reduction of the iodine to hydriodic acid, is it necessary to establish a suitable pH value separately, for example by means of a mineral acid, such as HCl, $H_2SO_4$ or the like. When the reduction is complete, the sulphur dyestuff formed is isolated by filtration.

In the process according to the invention, the following are employed per sulphochloride group present in one mol of starting compound of the formula I: 0.001 to 0.5 mol, preferably 0.005 to 0.1 mol, of hydriodic acid or a substance which provides hydriodic acid; and 1 to 2, preferably 1.25 to 1.75, reduction equivalents of the reducing agent which converts iodine into hydriodic acid. In the case of sulphur dioxide, a bisulphite, a sulphite, phosphorous acid and a phosphite, this quantity is 2 to 4 mols, preferably 2.5 to 3.5 mols; in the case of hypophosphorous acid, a hypophosphite, a pyrosulphite, hydrazine, hydrazine chloride or hydrazine sulphate, this quantity is 1 to 2 mols, preferably 1.25 to 1.75 mols, and, in the case of dihydrazine sulphate, this quantity is 0.5 to 1 mol, preferably 0.625 to 0.875 mol.

In a particular embodiment of the process according to the invention, the latter is carried out in the presence of a phase transfer catalyst and/or a surfactant.

Suitable phase transfer catalysts are described, for example, in Charles M. Starks and Charles Liotta: Phase Transfer Catalysis, Academic Press, New York, San Francisco, London, (1978), 57 to 88; F. Vögtle (editor), Host Guest Complex Chemistry I, Springer Verlag Berlin, Heidelberg, New York, (1981), 3 to 16, published in the series "Topics in Current Chemistry" as Volume 98; E. V. Dehmlov in Angewandte Chemie, International Edition, Volume 13, No. 3, (1974), 170; Jozef Dockx in Synthesis (1973), 441 to 456; Herbert Lehmkuhl, Farroch Rabet and Klaus Hauschild, Synthesis, (1977), 184 to 186; and Fernando Montanari, Dario Landini and Franco Rolla: Phase Transfer Catalysed Reactions in "Topics in Current Chemistry" (1982), Volume 101, 163 to 172.

Phase transfer catalysts which are particularly suitable within the scope of the present invention are onium salts, for example those of the formulae

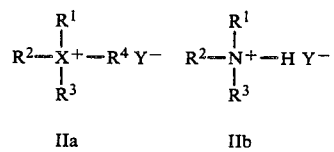

wherein $R^1$, $R^2$, $R^3$ and $R^4$ denote identical or different alkyl radicals having 1 to 25 C atoms, hydroxyalkyl radicals having 2 to 25 C atoms, aryl, especially phenyl, aralkyl, especially benzyl, and cycloalkenyl, especially cyclopentenyl and cyclohexenyl, and $X^+$ denotes $N^+$, $P^+$, $As^+$ or $S^+$ and $Y^-$ denotes an anion, in particular $Cl^-$, $Br^-$, $I^-$, $NO_3^-$, $HSO_4^-$, $\frac{1}{2}SO_4''$, $\frac{1}{3}PO_4'''$, $CN^-$, tosylate, benzoate, picrate, p-nitrobenzoate, perchlorate, β-naphthalenesulphonate or acetate. In the formulae II, it is also possible for two of the radicals $R^1$, $R^2$, $R^3$ or $R^4$ together with the $X^+$ or $N^+$ to which they are attached, to form a ring system having 5 to 7 C atoms. Amongst the compounds of the formula IIa, ammonium salts are preferred.

Iodonium salts corresponding analogously to the onium compounds of the formula IIa or IIb are also suitable.

Dionium and polyonium salts, that is to say compounds in which the onium grouping, for example $R^1$, $R^2$, $R^3$, $R^4$ and $X^+$, is repeated several times, are also suitable. In these compounds the $X^+$ atoms are linked to one another by aralkyl groups or long alkyl radicals having more than 10 C atoms.

The onium salts preferably contain more than 10 C atoms, preferably 16 to 40 C atoms, but, as a rule, less than 70 C atoms, per positively charged onium atom.

The following are also suitable as phase transfer catalysts: cyclic oligomers of ethylene oxide or macrocyclic polyethers of the formula III

in which m denotes 4 to 10, that is to say so-called crown ethers, to which one or more benzene or cyclohexane nuclei can also be fused (C. J. Pederson, J.A.C.S 89, (1967), 7017); and also coronand sulphides (thia-crown ethers), that is to say crown ethers of the above-mentioned formula in which one oxygen atom, several oxygen atoms or all the oxygen atoms have been replaced by —S—; coronand amines (aza-crown ethers), that is to say crown ethers of the abovementioned formula III in which one oxygen atom, several oxygen atoms or all the oxygen atoms have been replaced by —NH— groups. Correspondingly, mixed O-, N-, S- or P-coronands and also coronands containing hetero-aromatic rings, that is to say crown ethers in which one or more ethano groupings (—CH$_2$OCH$_2$—) have been replaced by hetero-aromatic nuclei, such as furan, pyridine or thiophene, incorporated in the crown ether ring, are also suitable. Examples of other suitable compounds are cryptans, that is to say aza-crown ethers or coronand amines having, in the crown ether ring, at least two nitrogen atoms which are bridged by additional oligoether chains, and also many-sided crown compounds. One or more benzene or cyclohexane nuclei can also be fused to all the compounds mentioned above. Open-chain crown compounds and open-chain cryptans, both of which are also described as so-called podands, are also very suitable.

Suitable open-chain crown compounds are, in particular, acyclic oligomers of ethylene oxide, above all those of the formulae:

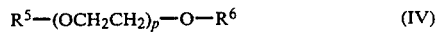

$$R^5-(OCH_2CH_2)_p-O-R^6 \quad (IV)$$

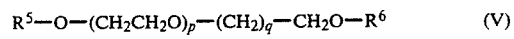

$$R^5-O-(CH_2CH_2O)_p-(CH_2)_q-CH_2O-R^6 \quad (V)$$

(VI)

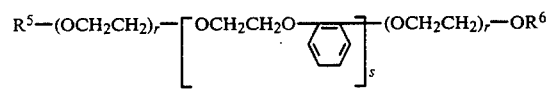

wherein R$^5$ and R$^6$ are different or, preferably, are identical and denote alkyl radicals having 1 to 15 C atoms, in particular methyl, quinolyl, in particular quinol-8-yl, alkylcarbonyl having 1 to 15 C atoms in the alkyl radical, in particular methylcarbonyl, phenyl or phenyl which is substituted, particularly in the 2-position, by alkoxy having 1 to 4 C atoms, in particular OCH$_3$, nitro, COOH, alkoxycarbonyl having 1 to 4 C atoms in the alkoxy radical, in particular COOC$_2$H$_5$, alkylaminocarbonyl having 1 to 4 C atoms in the alkyl radical or alkylcarbonylamino having 1 to 4 C atoms in the alkyl radical, and p denotes 3 to 50, in particular 3 to 25, q denotes 1 to 10, in particular 3, r denotes 2 to 12 and s denotes 1 to 6, in particular 1 to 4. Further suitable phase transfer catalysts are so-called podandocoronands, octopus molecules and macrocyclic oligoketones and spherands. Suitable macrocyclic oligoketones are derived from the crown ether formula indicated above by replacing one oxygen atom, several oxygen atoms or all the oxygen atoms by keto groups (—CO—). The phase transfer catalysts listed above are described, for example in F. Vögtle, Host Guest Complex Chemistry I, loc. cit., and in the literature quoted therein.

Further phase transfer catalysts which are suitable within the scope of the process according to the invention are tertiary amines of the formula VII

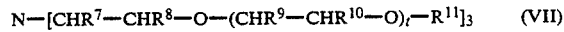

$$N-[CHR^7-CHR^8-O-(CHR^9-CHR^{10}-O)_t-R^{11}]_3 \quad (VII)$$

wherein t is an integer from 0 to 10 (0≦n≦10), R$^7$, R$^8$, R$^9$ and R$^{10}$ are identical or different and represent a hydrogen atom or an alkyl radical having 1 to 4 C atoms and R$^{11}$ denotes an alkyl or cycloalkyl radical having 1 to 12 C atoms, a phenyl radical or a —C$_v$H$_{2v+1}$—C$_6$H$_5$ or —C$_v$H$_{2v}$—C$_6$H$_5$ radical in which v is between 1 and 12. The preparation of the compounds of the formula VII is described in European Patent Specification Nos. 21,868 and 21,927.

Examples of suitable surfactants are anionic surfactants, such as, for example, sulphuric acid esters, such as sulphated oils and fatty acids, sulphated esters and amides, alkylsulphates, sulphated ethers, and alkylsulphonates, such as sulphosuccinic acid esters or alkylnaphthalenesulphonates; cationic surfactants, such as primary, secondary and tertiary amine salts or quaternary ammonium, phosphonium or sulphonium compounds; amphoteric surfactants, such as betaines, sulphobetaines and sulphate-betaines; and non-ionic surfactants, such as, for example, fatty acid esters of alcohols, ethylene glycol, polyethylene glycols, propylene glycols, glycerol, polyglycerol, sorbitol, pentaerythritol or sucrose; fatty amines, fatty amides, polyamines and polyglycol ethers of alcohols, fatty acids, fatty acid esters, such as glycerides or sorbitol esters, fatty amines, polypropylene glycols or alkylphenols; and also polypropylene glycol ethers of alcohols, fatty acids or fatty amines. Suitable surfactants are described, for example, in Ullmanns Encyklopädie der techn. Chemie (Ullmann's Encyclopaedia of Industrial Chemistry), 3rd edition, Volume 16, (1965), 724 to 736, and J. P. Sisley, Encyclopaedia of Surface-Active Agents, Chemical Publishing Co. Inc., New York (1964). Preferred surfactants are ethoxylation products of fatty alcohols, fats, fatty acids and alkanesulphonates.

The following are examples of suitable onium salts of the formula IIa and IIb: tetrabutylammonium chloride, bromide, iodide, acetate or sulphate; benzyltributylammonium chloride, bromide or iodide, a trialkylmethylammonium chloride, bromide or iodide, preferably having 7 to 12 C atoms in the alkyl radicals, such as, for example, trioctylmethylammonium chloride; a dialkyldimethylammonium chloride, bromide or iodide, preferably having 8 to 20 C atoms in the alkyl radicals, such as, for example, dihexadecyldimethylammonium bromide, dilauryldimethylammonium chloride or dieicosyldimethylammonium chloride; an alkyltrimethylammonium chloride, bromide or iodide, preferably having 10 to 25 C atoms in the alkyl radical, such as, for example, hexadecyltrimethylammonium bromide or octyltributylammonium bromide; an alkyldimethylbenzylammonium chloride, bromide or iodide, preferably having 10 to 20 C atoms in the alkyl radical; hexadecylpyridinium bromide; tetradodecylammonium bromide; tetraheptylammonium bromide; tetrahexylammonium chloride, bromide or iodide; tributylheptylammonium bromide; N-benzyltriethylammonium chloride; ethyltrioctylphosphonium bromide; tetrabutylphosphonium bromide, hexadecyltripropylphosphonium bromide or triphenylethylphosphonium bromide; 3-benzyl-5-(2-hydroxyethyl)-4-methylthiazolium chloride; a trialkylammonium chloride, bromide or iodide, preferably having 7 to 12 C atoms in the alkyl radicals; dialkylmethylammonium chloride, bromide or iodide, in particular having 8 to 20 C atoms in the alkyl radicals; or an alkyldimethylammonium chloride, bromide or iodide, in particular having 10 to 25 C atoms in the alkyl radical. Mixtures of different onium salts can also be used.

The following are examples of further suitable phase transfer catalysts: 12-crown-4, 15-crown-5, 18-crown-6, 21-crown-7, 24-crown-8, benzo-15-crown-5, dibenzo-18-crown-6, dicyclohexano-18-crown-6, dibenzo-24-crown-8, dicyclohexano-24-crown-8, dibenzo-30-crown-10, 5,6,14,15-dibenzo-8,12-diaza-1,4-dioxacyclopentadeca-5,14-diene, 4,7,13,16,21,24-hexaoxa-1,10-diazabicyclo[8,8,8]-hexacosane (=cryptand[2,2,2]), 1,16-dimethyl($O_6$-podand-6) (=pentaglyme), tris-(3-oxabutyl)-amine, tris-(3,6,9-trioxadecyl)-amine, tris-(3,6-dioxaheptyl)-amine, tris-(3,6-dioxaoctyl)-amine, tris-(3,6,9-trioxaundecyl)-amine, tris-(3,6-dioxanonyl)-amine, tris-(3,6,9-trioxadodecyl)-amine, tris-(3,6,9-trioxatridecyl)-amine, tris(3,6,9,12,15,18-hexaoxanonadecyl)-amine, tris-(3,6-dioxa-4-methylheptyl)-amine, heptaethylene glycol dimethyl ether, docosoethylene glycol dimethyl ether, pentatetracontaethylene glycol dimethyl ether, octaethylene glycol methyldodecyl ether, octaethylene glycol biphenyl ether and octaethylene glycol methyl ether-acetate (=$H_3CO$—$(CH_2CH_2O)_8$—$COCH_3$).

It is also possible to use mixtures, or, if appropriate, technical mixtures, of phase transfer catalysts and/or surfactants. 0.0001 to 0.05 mol, preferably 0.001 to 0.02 mol, of the phase transfer catalyst and/or the surfactant is normally employed per mol of starting compound of the formula I. It is particularly advantageous if the phase transfer catalyst and/or the surfactant, dissolved in ice water, are initially taken and precipitation of the phthalocyaninesulphochloride of the formula I to be employed is effected in this solution, and the hydriodic acid, the substance which splits off hydriodic acid and the further reducing agent are then added, and the process according to the invention is carried out.

The reduction products obtained in the process according to the invention are, in high yields, blue and green sulphur dye-stuffs in the water-insoluble form, which can be converted into the water-soluble leuco sulphur dyestuffs by processes which are in themselves known, for example by means of sodium sulphide, sodium hydrogen sulphide or sodium dithionite, and are outstandingly suitable for dyeing, in particular, cellulose fibres. Brilliant blue to green dyeings having a high depth of colour and a very good level of fastness are obtained. In most cases dyestuffs having enhanced tinctorial strengths are obtained if a phase transfer catalyst and/or surfactant is used.

The leuco sulphur dyestuffs prepared from the water-insoluble sulphur dyestuffs by means of reducing agents which are in themselves known (compare, for example, Ch. Heid et al., Melliand Textilber. 12, 1314 (1973); and W. E. Wood, Rev. Progr. Coloration 7, 80 (1976)) have a high degree of solubility and can be employed as concentrated liquid dyestuffs ready for dyeing.

It is also possible to convert the water-insoluble sulphur dyestuffs produced in the process according to the invention into thiosulphuric acid derivatives (Bunte salts) by methods which are already known (compare, for example, C. D. Weston in K. Venkataraman "The Chemistry of Synthetic Dyes", Volume VII, pages 35 to 68, Academic Press 1974).

Particular advantages of the process according to the invention, in respect of profitability and protection of the environment, are afforded by the fact that the phthalocyaninesulphochlorides can be directly converted in one stage into the corresponding sulphur dyestuffs and that the factory effluents produced are free from heavy metal salts and have a low biological and chemical oxygen demand.

The examples which follow serve to illustrate further the process according to the invention. Unless otherwise specified, parts are parts by weight and percentages are percentages by weight.

EXAMPLE 1

97 g (0.1 mol) of copper phthalocyaninetetrasulphochloride, prepared by sulphochlorinating 57.6 g of copper phthalocyanine with chlorosulphonic acid and thionyl chloride at an elevated temperature, and subsequent precipitation on ice, are introduced, in the form of the water-moist, 40% strength press cake, into 500 ml of water in a 1.3 liter tantalum autoclave. 2 ml of 57% strength hydriodic acid are then added and 60 ml of sulphur dioxide are injected at 20° to 25° C., while stirring. The autoclave is then heated to 95° to 100° C. and stirring is continued for a further 9 hours until the pressure is constant at 2 bar. The mixture is then stirred until cold and released from pressure. The green, water-insoluble sulphur dyestuff is isolated by filtration and washed with water until it is free from acid. Yield: 170.4 g of a green dyestuff paste; 85 g of green dyestuff powder after drying at 90° C.

The dyestuff obtained is suspended in water and dissolved by means of 100 g of 60% strength sodium sulphide and 250 g of 30% strength sodium hydrosulphide. This gives 1,200 g of an aqueous solution of the dyestuff, ready for dyeing. The dyestuff is particularly suitable in this form for use in dyeing processes which operate continuously. 150 g of the ready-for-dyeing solution of the dyestuff are diluted to 1,000 ml with water. This padding liquor is used to pad a cotton fabric on a padder at a liquor pickup of 80%. The padded fabric is immediately introduced into an air-free steamer and is steamed for 40 seconds at 120° C. It is then rinsed, oxidised with $H_2O_2$, dichromate or the like in the manner customary for sulphur dyeings, rinsed and dried. This gives a deep, clear, green dyeing which has very good fastness properties.

EXAMPLE 2

A solution, prepared by known processes (compare, for example, British Patent Specification No. 960,643), of 97 g of copper phthalocyaninetetrasulphochloride in chlorosulphonic acid is added to a mixture of 200 ml of water and 4 g of tridecyltrimethylammonium chloride (tridecyl here is a mixture of $C_{12}H_{25}$- to $C_{14}H_{29}$-alkyl groups) and 500 g of ice, steps being taken, by external cooling and adding further ice, to ensure that the temperature does not exceed 0° to 5° C. during the precipitation.

The aqueous suspension of copper phthalocyaninetetrasulphochloride is transferred to a 2 liter enamelled autoclave and 1.5 g of iodine are added. 60 ml of sulphur dioxide are then injected, the mixture is stirred for 1 hour at 20° to 25° C. and is heated slowly to 100° C., while stirring well. The mixture is stirred for 6 hours at 100° C. and is then cooled to 20° C. and the pressure is released. The green, water-insoluble sulphur dyestuff is filtered off and washed until free from acid.

Yield: 260 g of green dyestuff paste.

When treated with sodium sulphide and hydrosulphide solution in accordance with the procedure described in Example 1, a suspension of this dyestuff paste in water affords a ready-for-dyeing solution which produces deep green dyeings, having good fastness properties, on cotton.

EXAMPLE 3

A solution, prepared in a known manner, of 97 g of copper phthalocyaninetetrasulphochloride in chlorosulphonic acid is added to a mixture of 3.5 g of dodecylbenzyldimethylammonium chloride, 200 ml of water and 500 g of ice, while stirring well. The temperature of the precipitation is kept at 0° to 5° C. by means of external cooling and adding further ice. The aqueous suspension of copper phthalocyaninetetrasulphochloride is transferred to a 3 liter enamelled autoclave and 0.7 g of iodine is added. 286 g of a 40% strength by weight solution of sodium bisulphite are then injected at 5° to 10° C. The mixture is heated slowly to 120° C., stirred at 120° C. for a further 6 hours until the pressure is constant at 4 bar, cooled to 25° C. and released from pressure. The green, water-insoluble sulphur dyestuff is isolated by filtration and washed with water until it is free from acid.

Yield: 203 g of green dyestuff paste.

When treated in accordance with the procedure indicated in Example 1, an aqueous suspension of this dyestuff press cake affords a ready-for-use dyestuff solution which produces green dyeings on cotton which have a high tinctorial strength and a very good level of fastness.

EXAMPLES 4 TO 18

0.1 mol of each of the phthalocyaninesulphochlorides in the table below is converted into sulphur dyestuffs analogously to Example 1, under the conditions indicated in the table. If HI is employed in this reaction, it is used in the form of a 57% strength aqueous solution. The terms in the 4th column of the table below have the following meanings:

A: Tridecyldimethylbenzylammonium chloride (tridecyl here is a mixture of $C_{12}H_{25}$- to $C_{14}H_{29}$-alkyl groups)
B: Diheptadecyldimethylammonium chloride (heptadecyl here is a mixture of $C_{16}H_{38}$- to $C_{18}H_{37}$-alkyl groups)
D: Ethoxylated castor oil (containing 10 to 20 glycol units)
E: Ethoxylated oleyl alcohol (containing 20 glycol units)
F: A secondary alkanesulphonate having a chain length of 13 to 17 C atoms
G: Trioctylamine
H: Tris-(3,6-dioxaheptyl)-amine
K: 2,7,10,13,16,19-Hexaoxaeicosane
L: Ethyl trioctylphosphonium bromide
M: Tetrabutylammonium iodide The terms in the second column have the following meanings:
Pc: Phthalocyanine
CuPc: Copper phthalocyanine
CoPc: Cobalt phthalocyanine
NiPc: Nickel phthalocyanine As shown in Example 10, the onium salt of the formula II can also be used at the same time as the substance which provides hydriodic acid.

| Example No. | Phthalocyanine-sulphochloride employed | Added quantity of: HI, KI or I | Phase transfer catalyst, surfactant or tertiary amine | Reaction medium | Colour shade on cotton |
|---|---|---|---|---|---|
| 4 | $CuPc(SO_2Cl)_4$ | 2 g of KI | 3 g of A | Water | green |
| 5 | $CuPc(SO_2Cl)_4$ | 3 g of KI | — | 10% strength acetic acid | " |
| 6 | $CuPc(SO_2Cl)_4$ | 2.5 g of KI | — | 50% of water 5% of methanol | " |
| 7 | $CuPc(SO_2Cl)_4$ | — | 6 g of M | Water | " |
| 8 | $CuPc(SO_2Cl)_2$ | 2 ml of HI | 2 g of B | " | blue |
| 9 | $Pc(SO_2Cl)_4$ | 2 ml of HI | 1.6 g of C | " | green |
| 10 | $NiPc(SO_2Cl)_4$ | 2 ml of HI | 2 g of B | " | " |
| 11 | $CoPc(SO_2Cl)_3$ | 2 ml of HI | 2 g of B | " | blue-green |
| 12 | $CuPc(SO_2Cl)_4$ | 1.5 g of I | 1.2 g of D | " | green |
| 13 | $CuPc(SO_2Cl)_3$ | 1.7 g of I | 1.0 g of E | " | " |
| 14 | $CuPc(SO_2Cl)_4$ | 1.5 g of I | 1.5 g of F | " | " |
| 15 | $CuPc(SO_2Cl)_4$ | 1.5 g of I | 1.3 g of G | " | " |
| 16 | $CuPc(SO_2Cl)_4$ | 1.5 g of I | 1.2 g of H | " | " |
| 17 | $CuPc(SO_2Cl)_4$ | 1.5 g of I | 1.2 g of K | " | " |
| 18 | $CuPc(SO_2Cl)_4$ | 1.5 g of I | 1.9 g of L | "" | |

We claim:

1. In the process for preparation of phthalocyanine sulphur dyestuffs by reducing phthalocyaninesulphochlorides of the formula $Pc(SO_2Cl)_n$ wherein Pc is a metal-free or metal-containing phthalocyanine moiety and n is an integer from 1 to 4, the improvement comprises reducing said phthalocyaninesulphochlorides in the presence of hydriodic acid and a reducing agent which converts iodine into hydriodic acid with the proviso that said reducing agent is other than a free metal.

2. The process according to claim 2 wherein hydriodic acid is present in catalytic amounts.

3. The process according to claim 2 wherein the amount of hydriodic acid is about 0.001 to 0.5 moles per sulphochloride moiety in said phthalocyaninesulphochloride.

4. The process according to claim 1 wherein the hydriodic acid is produced in situ from an agent producing hydriodic acid in the reaction environment.

5. The process according to claim 4 wherein hydriodic acid is produced in situ from iodine or an iodide salt.

6. The process according to claim 1 wherein said reducing agent is sulphur dioxide or agents which produce sulphur dioxide in situ.

7. The process according to claim 1 wherein the reduction is conducted in the presence of water or an aqueous solution of water-miscible organic solvent.

8. The process according to claim 7 wherein said water-miscible organic solvent is alkanol having 1 to 4 carbon atoms, acetone, methyl ethyl ketone, formic acid or acetic acid.

9. The process according to claim 1 wherein the reduction is carried out in the presence of a phase transfer catalyst.

10. The process according to claim 1 wherein the reduction is carried out in the presence of a surfactant.

11. The process according to claim 1 wherein the phthalocyaninesulphochloride is copper phthalocyaninesulphochloride, nickel phthalocyaninesulphochloride or cobalt phthalocyaninesulphochloride.

12. The process according to claim 1 wherein the phthalocyaninesulphochloride is a compound wherein n is the integer 2, 3 or 4.

13. The process according to claim 1 wherein the reduction is carried out at a temperature from about 20° to 200° C.

14. The process according to claim 1 wherein the reduction is carried out during a time of about 0.5 to 8 hours.

15. The process according to claim 1 wherein the reduction is carried out at a pH of about 4 or less.

* * * * *